United States Patent
Miller

(10) Patent No.: US 6,779,537 B1
(45) Date of Patent: Aug. 24, 2004

(54) PORTABLE HUNTING BLIND

(76) Inventor: Vincent E. Miller, 325 Nance Tarlton Rd., Marshville, NC (US) 28103

( * ) Notice: Subject to any disclaimer, the term of this patent is extended or adjusted under 35 U.S.C. 154(b) by 0 days.

(21) Appl. No.: 10/462,054

(22) Filed: Jun. 16, 2003

(51) Int. Cl.⁷ .............................................. E04H 15/58
(52) U.S. Cl. ......................... 135/117; 135/901; 40/517
(58) Field of Search ............................. 135/117, 120.1, 135/90, 95, 96, 901, 902, 903; 40/514, 517; 160/45, 66, 238; 43/1

(56) References Cited

U.S. PATENT DOCUMENTS

| | | | |
|---|---|---|---|
| 2,146,041 A | * 2/1939 | Wolfson et al. | 40/514 |
| 3,487,842 A | * 1/1970 | Gustav et al. | 135/121 |
| 4,067,346 A | 1/1978 | Husted | |
| 4,761,908 A | 8/1988 | Hayes | |
| 5,062,234 A | * 11/1991 | Green | 43/1 |
| 5,359,797 A | * 11/1994 | Williamson | 280/816 |
| 5,437,298 A | * 8/1995 | Lin | 135/117 |
| 5,477,875 A | 12/1995 | Daly, Jr. | |
| 5,572,823 A | 11/1996 | Savaria | |
| 5,609,176 A | * 3/1997 | Weeks | 135/96 |
| 5,678,346 A | 10/1997 | Kellett | |
| 6,003,749 A | 12/1999 | Sabo | |
| 6,148,836 A | * 11/2000 | Cananzey | 135/87 |
| 6,434,877 B1 | * 8/2002 | Shelton | 43/1 |

FOREIGN PATENT DOCUMENTS

DE     2348796     * 4/1975

* cited by examiner

Primary Examiner—James O. Hansen
(74) Attorney, Agent, or Firm—Donald R. Schoonover

(57) ABSTRACT

A hunting blind includes a housing unit having a flexible sheet of camouflage material stored therein on a shaft that is rotatably mounted on the housing unit. The shaft can be locked against rotation or permitted to rotate as desired to permit deployment of the camouflage material. Straps are attached to the housing unit. The straps are connectable to supports, such as trees or the like.

5 Claims, 3 Drawing Sheets

PORTABLE HUNTING BLIND

BACKGROUND OF THE INVENTION

1. Field of the Invention

The present invention relates to the general art of hunting, and to the particular field of hunting blinds.

2. Discussion of the Related Art

Many hunters use blinds. Most presently available hunting blinds are difficult and time-consuming to set up and/or to dismantle. For this reason, some hunters may set up a hunting blind and then leave it. This may be inconvenient, restrictive, expensive and wasteful.

While the art contains several examples of portable hunting blinds, these blinds have several drawbacks. For example, the portable hunting blinds that are presently available may not be easy and quick to set up and dismantle. Furthermore, these presently available hunting blinds may not be amenable to use in a wide variety of environmental or terrain conditions and thus may not be as versatile as desired. Some hunting blinds simply cannot be set up on some terrain.

Because presently available hunting blinds are not as versatile as desired, their appeal is limited to a small segment of the purchasing public.

Therefore, there is need for a hunting blind that is versatile.

Also, some presently available hunting blinds are not easy to transport because they are bulky, or because they are heavy, or both. Again, this limits the segment of the purchasing public that is interested in prior art hunting blind.

Therefore, there is need for a hunting blind that is easy to transport.

Emergency situations often arise out of doors. For example, inclement weather may suddenly arise. Such weather ranges from simple showers to torrential downpours. It is almost always desirable to have shelter in such conditions. However, if a shelter is difficult to set up, a person may be tempted to simply ride out the storm rather than go to the trouble of erecting a shelter. This is especially true if the problem occurs while the person is in difficult terrain.

Therefore, there is need for a hunting blind that is easy to erect in an emergency situation.

PRINCIPAL OBJECTS OF THE INVENTION

It is a main object of the present invention to provide a hunting blind that is versatile.

It is another object of the present invention to provide a hunting blind that is easy to transport.

It is another object of the present invention to provide a hunting blind that is easy to erect in an emergency situation.

It is another object of the present invention to provide a hunting blind that is easy and quick to erect and dismantle.

SUMMARY OF THE INVENTION

These, and other, objects are achieved by a portable hunting blind that comprises a housing unit; a shaft rotatably mounted in the housing unit; flexible camouflage material connected to the shaft to be wound around the shaft when the shaft rotates in a winding direction and to be unwound from the shaft when the shaft is rotated in an unwinding direction; a lock on the shaft to prevent rotation of the shaft when the lock is engaged, the shaft being movably mounted on the housing unit to move between a locked position with the lock engaged to prevent rotation of the shaft and an unlocked position with the lock disengaged to permit rotation of the shaft in either the winding direction or the unwinding direction; mounting elements on the housing unit which are attachable to a first support; and mounting elements on the flexible camouflage material that are attachable to a second support.

The hunting blind embodying the present invention can be erected anywhere there are two spaced-apart supports, such as two trees, or one tree and a fence post, or two fence posts or the like. The hunting blind is easily erected by simply attaching straps to one support, releasing the blind, stretching the blind to an adjacent support, attaching the blind to the adjacent support, tightening the blind, and locking it. The blind is easily dismantled by reversing the just-described process. The blind is contained in a housing that is easy to pack and transport. Thus the blind embodying the present invention is very easy to transport, erect, and dismantle and can be used anywhere. The blind is thus very versatile and can be used by a wide variety of people. The blind can be quickly set up in an emergency situation as well.

BRIEF DESCRIPTION OF THE DRAWING FIGURES

DETAILED DESCRIPTION OF THE PREFERRED EMBODIMENT

Figure 1:
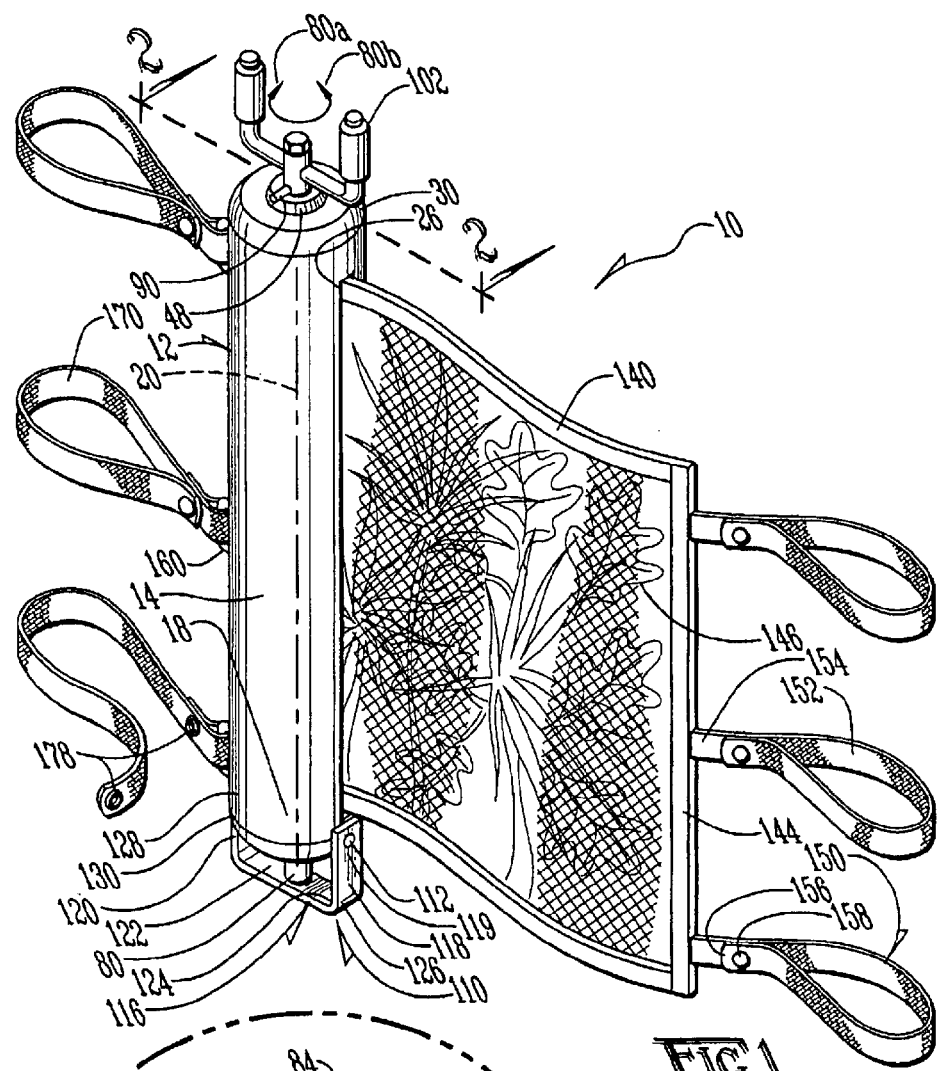
FIG. 1 is a perspective view of the hunting blind embodying the present invention in a partially deployed condition.
Figure 2:
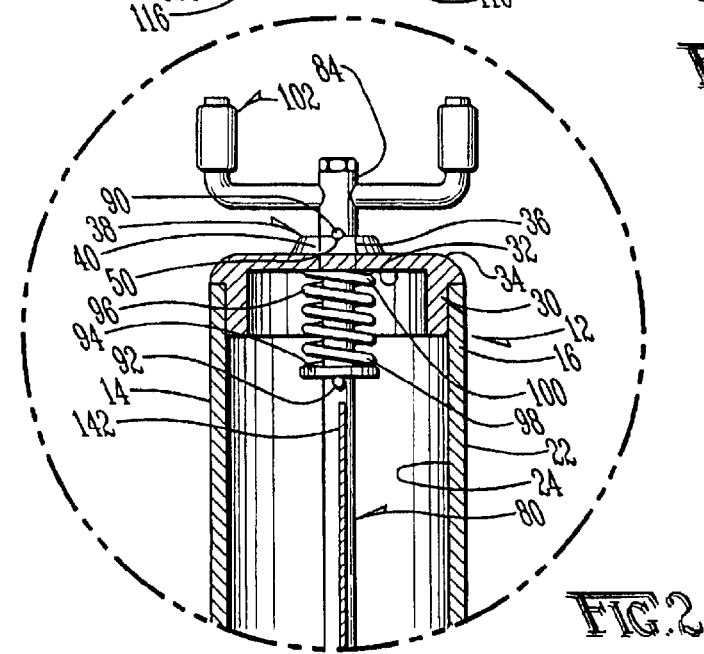
FIG. 2 shows a portion of the hunting blind of the present invention.

Other objects, features and advantages of the invention will become apparent from a consideration of the following detailed description and the accompanying drawings.

Referring to the Figures, it can be understood that the present invention is embodied in a portable hunting blind 10 which is very versatile and portable. Hunting blind 10 comprises a housing unit 12. Housing unit 12 includes a cylindrical wall 14 having a first end 16, a second end 18, and a longitudinal axis 20 which extends between the first end 16 of the wall 14 and the second end 18 of the wall 14. Wall 14 includes an outer surface 22 and an inner surface 24. An elongate opening 26 is defined through the wall 14 and extends in the direction of the longitudinal axis 20 of the wall 14.

A first retaining cap 30 is mounted on the cylindrical wall 14 near the first end 16 of the wall 14. First retaining cap 30 includes an inner surface 32 located adjacent to the inner surface 24 of the wall 14 and an outer surface 34. The first retaining cap 30 further includes a shaft-accommodating hole 36 defined therethrough and a cylindrical shaft-accommodating collar 38 is mounted thereon on the outer surface 34 of the first retaining cap 30. Shaft-accommodating collar 38 includes a first end 40 mounted on the outer surface 34 of the first retaining cap 30 and a second end 42 spaced apart from the first end 40 of shaft-accommodating collar 38 in the direction of the longitudinal axis 20 of the wall 14 of the housing unit 12. A longitudinal axis 44 extends between the first end 40 of shaft-accommodating collar 38 and the second end 42 of shaft-accommodating collar 38. Longitudinal axis 44 is co-linear with longitudinal axis 20 of the wall 14 of the housing unit 12. A rim 48 is located on the first end 40 of shaft-accommodating collar 38, and a notch 50 is defined in the rim 48 of shaft-accommodating collar 38. The notch 50 extends from rim 48 toward the second end 42 of shaft-accommodating collar 38.

A second retaining cap 60 is mounted on the cylindrical wall 14 near the second end 18 of the wall 14. Second retaining cap 60 includes an inner surface 62 located adjacent to the inner surface 24 of the wall 14 and an outer surface 64. Second retaining cap 60 further includes a shaft-accommodating hole 66 defined therethrough and a cylindrical shaft-accommodating collar 70 is mounted on the outer surface 64 of the second retaining cap 60. Shaft-accommodating collar 70 includes a first end 72 mounted on the outer surface 64 of the second retaining cap 60, a second end 74 spaced apart from the first end 72 of shaft-accommodating collar 70 in the direction of the longitudinal axis 20 of the wall 14 of the housing unit 12. A longitudinal axis 76 extends between the first end 72 of shaft-accommodating collar 70 and the second end 74 of shaft-accommodating collar 70. Longitudinal axis 76 of shaft accommodating collar 70 is co-linear with the longitudinal axis 20 of the wall 14 of the housing unit 12. A rim 78 is located on the first end 72 of shaft-accommodating collar 70.

Figure 3:
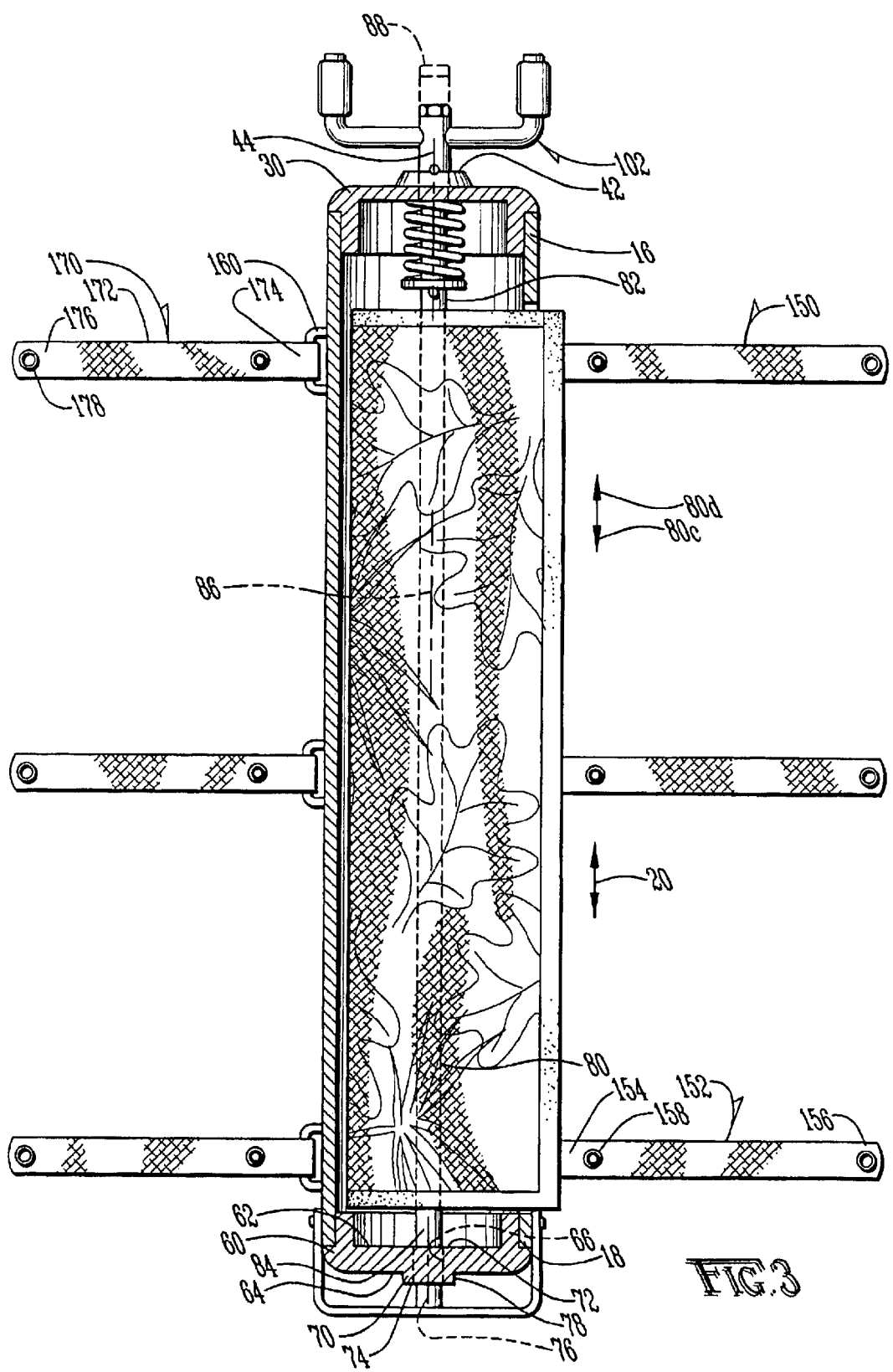
FIG. 3 is an elvational view of the hunting blind of the present invention in a stored condition with straps deployed for illustration purposes.

A shaft 80 extends through shaft-accommodating collar 38 and along the longitudinal axis 20 of the housing unit 12 and through shaft-accommodating collar 70. Shaft 80 has a first end 82 located adjacent to the rim 48 of shaft-accommodating collar 38 and a second end 84 located adjacent to the second end 74 of shaft-accommodating collar 70. A longitudinal axis 86 of the shaft 80 extends between the first end 82 of the shaft 80 and the second end 84 of the shaft 80. The longitudinal axis 86 of the shaft 80 is co-linear with the longitudinal axis 20 of the cylindrical wall 14 of the housing unit 12. Shaft 80 is rotatably mounted on the housing unit 12 by the first and second shaft-accommodating collars 38, 70 to rotate in directions 80a and 80b about the longitudinal axis 86 of the shaft 80. Shaft 80 is also movably mounted on the housing unit 12 to move in the direction of the longitudinal axis 86 of the shaft 80 in directions 80c and 80d between a locked position shown in solid lines in FIG. 3 and an unlocked position indicated in dotted lines designated by the numeral 88 in FIG. 3.

A locking pin 90 is mounted on the shaft 80. The locking pin 90 is located on the shaft 80 near notch 50 defined in shaft-accommodating collar 38. The locking pin 90 is located in the notch 50 when the shaft 80 is in the locked position and the locking pin 90 is spaced apart from the notch 50 when the shaft 80 is in the unlocked position.

A retaining pin 92 is fixed on the shaft 80. The retaining pin 92 is located inside the housing unit 12 near the first retaining cap 30.

A spring abutment flange 94 is mounted on the shaft 80 and abuts the retaining pin 92.

A compression spring 96 surrounds the shaft 80. The compression spring 96 has a first end 98 which abuts the spring abutment flange 94 and a second end 100 which abuts the inner surface 22 of the first retaining cap 30. Compression spring 96 biases the shaft 80 away from the first end 16 of the cylindrical wall 14 of the housing unit 12 toward the second end 18 of the cylindrical wall 14 of the housing unit 12 to bias the shaft 80 toward the locked position of the shaft 80 and away from the unlocked position of the shaft 80.

A handle 102 is fixedly mounted on the second end 84 of the shaft 80 and is used to rotate the shaft 80 as will be understood from the teaching of the present disclosure.

A shaft-unlocking unit 110 is mounted on the housing unit 12. Shaft-unlocking unit 110 includes two pivot pins, such as pivot pin 112, fixed to the cylindrical wall 14 adjacent to the second end 18 of the cylindrical wall 14. Unit 110 further includes a U-shaped handle 116 which has a first leg 118 pivotally connected to one pivot pin at a proximal end 119 of the first leg 118 and a second leg 120 pivotally connected to a second pivot pin of the two pivot pins at a proximal end (not shown, but identical to proximal end 119) of the second leg 120. A bight section 122 has a first end 124 connected to a distal end 126 of the first leg 118 and a second end 128 connected to a distal end 130 of the second leg 120. The handle 116 is movable between a shaft-locking position in which the bight section 122 of the handle 116 is spaced apart from the longitudinal axis 20 of the housing unit 12 with the bight section 122 of the handle 116 being spaced apart from the second end 84 of the shaft 80 and a shaft-unlocking position shown in solid lines in FIG. 1 in which the bight section 122 of the handle 116 intersects the longitudinal axis 20 of the housing unit 12 and the longitudinal axis 86 of the shaft 80 with the second end 84 of the shaft 80 in abutting contact with the bight section 122 of the handle 116 when the handle 116 is in the shaft-unlocking position. The shaft 80 is held in the unlocked position against the bias of the compression spring 96 with the locking pin 90 being spaced apart from the notch 50 in the rim 48 of shaft-accommodating collar 38 by the abutting contact between the second end 84 of the shaft 80 and the bight section 122 of the handle 116 when the handle 116 is in the shaft-unlocking position. The shaft 80 moves into the locked position with the locking pin 90 in the notch 50 on in the rim 48 of shaft-accommodating collar 38 under the influence of the bias of the compression spring 96 when the bight section 122 of the handle 116 is moved away from abutting contact with the second end 84 of the shaft 80 when the handle 116 is moved from the shaft-unlocking position into the shaft-locking position.

A flexible camouflage blind element 140 has a first end 142 fixed to the shaft 80 and a second end 144. The blind element 140 is adapted to be wound around the shaft 80 when the shaft 80 is rotated in a first direction and to be unwound from the shaft 80 when the shaft 80 is rotated in a second direction. The blind element 140 has surface indicia 146 thereon. The blind element 140 extends from inside the housing unit 12 to outside the housing unit 12 through the elongate opening 26 defined through the cylindrical wall 14 of the housing unit 12.

In one form of the portable hunting blind 10, the blind element 140 is mesh, and in another form, the blind element 140 is water-impervious material, such as plastic. The second form of the blind element 140 is used to protect a user from rain or the like as will be understood from the teaching of the following disclosure.

A plurality of first mounting straps, such as strap 150, are fixed to the second end 144 of the blind element 140. Each first mounting strap 150 includes a body 152, a first strap end 154 fixed to the second end 144 of the blind element 140, a second strap end 156 spaced apart from the first strap end 154, and a snap fastener 158 which releasably couples the second strap end 156 to the body 152 of the first mounting strap 150.

A plurality of D-rings, such as D-ring 160, are mounted on the outer surface 22 of the cylindrical wall 14 of the housing unit 12.

A plurality of second mounting straps, such as strap 170, are mounted on the D-rings 160. Each second mounting strap 170 includes a body 172, a first strap end 174, a second strap end 176, and a snap fastener 178.

Figure 4:
FIG. 4 shows the hunting blind embodying the present invention in a set up configuration between two adjacent supports.

As can be understood from the teaching of the present disclosure, portable hunting blind 10 is carried to a selected location with the blind element 140 stored inside the housing unit 12. As indicated in FIG. 4, once a suitable location is selected, mounting straps 170 are attached to a first structure, such as a tree T. The handle of unit 110 is operated to unlock shaft 80 and the blind element 140 is pulled out of the housing unit 12. The blind element 140 is stretched across gap G between tree T and second tree T2. Mounting straps 150 are then attached to second support, such as tree T2. Handle 102 is then rotated to tighten the blind element 140 between the trees, and the handle of unit 110 is returned to a shaft-locking position to lock shaft 80 against rotation. The blind 10 is disassembled by reversing the just-described process. It is noted that while two adjacent supports have been mentioned, those skilled in the art will understand that the supports need not be adjacent to each other. For example, the blind element 140 can be wrapped around an element that is located between the two supports that are being used for the system or can cover elements located between the two supports or the like.

Figure 5:
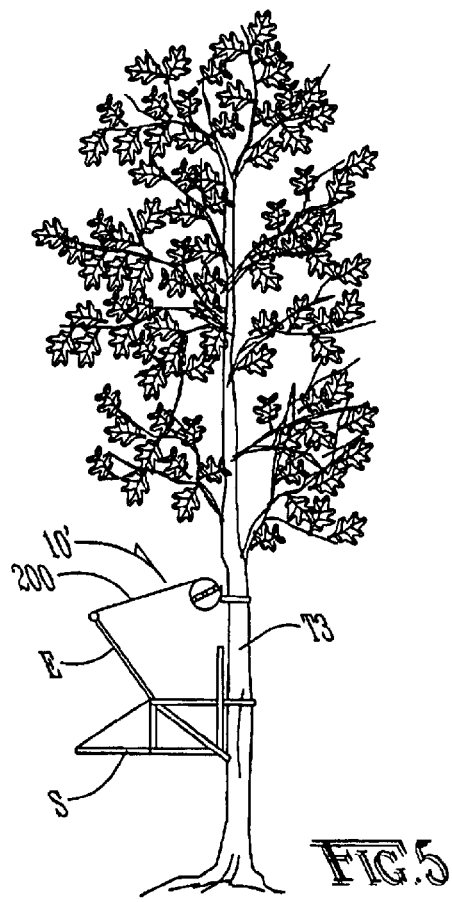
FIG. 5 illustrates the hunting blind embodying the present invention in a set up configuration as an emergency cover.

A second form of the portable hunting blind is indicated as blind 10' in FIG. 5. Blind 10' is mounted on a support, such as a tree T3, adjacent a tree-mounted stand S. Blind 10' includes water-impervious material 200 on or in place of blind element 140. The housing 12 is mounted on tree T3 using straps 170 and blind element 200 is stretched from the housing unit 12 after moving the handle of unit 110 in the manner described above for blind 10 to unlock the shaft 80 of blind 10'. Once the blind element 200 has extended over stand S, the blind element 200 is attached to stand S using straps 150 as hereinbefore described with regard to blind 10 to attach the blind element 140 to an element E of the stand or to a separate element that, itself, is mounted on the stand as is suitable. The handle of unit 10' can then be operated to apply the appropriate amount of tension to blind element 200, and then handle of unit 110 of blind 10' moved back into the shaft-locking position. An emergency shelter is thus easily and quickly formed. As will be understood from the teaching of the foregoing disclosure, the portable hunting blind 10 of the present invention can be easily and quickly assembled in nearly any location and is easily portable and stored.

It is understood that while certain forms of the present invention have been illustrated and described herein, it is not to be limited to the specific forms or arrangements of parts described and shown.

What is claimed and desired to be covered by Letters Patent is:

1. A portable hunting blind comprising:
   a) a housing unit which includes
      (1) a cylindrical wall having a fist end, a second end, a longitudinal axis extending between the first end of the wall and the second end of the wall, an outer surface, an inner surface, and an elongate opening defined through the wall and extending in the direction of the longitudinal axis of the wall,
      (2) a first retaining cap mounted on said cylindrical wall near the first end of the wall, the first retaining cap including an inner surface located adjacent to the inner surface of the wall and an outer surface, the first retaining cap further including a shaft-accommodating hole defined therethrough and a cylindrical shaft-accommodating collar mounted thereon on the outer surface of the first retaining cap, the shaft-accommodating collar on the first retaining cap including
         (A) a first end mounted on the outer surface of the first retaining cap,
         (B) a second end spaced apart from the first end of the shaft-accommodating collar on the first retaining cap in the direction of the longitudinal axis of the wall of said housing unit,
         (C) a longitudinal axis extending between the first end of the shaft-accommodating collar on the first retaining cap and the second end of the shaft-accommodating collar on the first retaining cap, the longitudinal axis of the shaft-accommodating collar on the first retaining cap being co-linear with the longitudinal axis of the wall of said housing unit,
         (D) a rim on the first end of the shaft-accommodating collar on the first retaining cap, and
         (E) a notch defined in the rim of the shaft-accommodating collar on the first retaining cap, the notch extending from the rim on the first end of the shaft-accommodating collar on the first retaining cap toward the second end of the shaft-accommodating collar on the first retaining cap,
      (3) a second retaining cap mounted on said cylindrical wall near the second end of the wall, the second retaining cap including an inner surface located adjacent to the inner surface of the wall and an outer surface, the second retaining cap further including a shaft-accommodating hole defined therethrough and a cylindrical shaft-accommodating collar mounted thereon on the outer surface of the second retaining cap, the shaft-accommodating collar on the second retaining cap including
         (A) a first end mounted on the outer surface of the second retaining cap,
         (B) a second end spaced apart from the first end of the shaft-accommodating collar on the second retaining cap in the direction of the longitudinal axis of the wall of said housing unit,
         (C) a longitudinal axis extending between the first end of the shaft-accommodating collar on the second retaining cap and the second end of the shaft-accommodating collar on the second retaining cap, the longitudinal axis of the shaft-accommodating collar on the second retaining cap being co-linear with the longitudinal axis of the wall of said housing unit, and
         (D) a rim on the first end of the shaft-accommodating collar on the second retaining cap;
   c) a shaft extending through the shaft-accommodating collar on the first retaining cap and along the longitudinal axis of said housing unit and through the shaft-accommodating collar on the second retaining cap, said shaft having a first end located adjacent to the rim on the shaft-accommodating collar on the first retaining cap, a second end located adjacent to the second end of the shaft-accommodating collar on the second retaining cap, and a longitudinal axis which extends between the first end of said shaft and the second end of said shaft, the longitudinal axis of said shaft being co-linear with the longitudinal axis of the cylindrical wall of said housing unit, said shaft being rotatably mounted on said housing unit by the first and second shaft-accommodating collars to rotate about the longitudinal axis of said shaft, said shaft further being movably mounted on said housing unit to move in the direction of the longitudinal axis of said shaft between a locked position and an unlocked position;
   d) a locking pin on said shaft, said locking pin being located on said shaft near the notch defined in the shaft-accommodating collar on the first retaining cap, said locking pin being located in the notch when said shaft is in the locked position and said locking pin being located spaced apart from the notch when said shaft is in the unlocked position;

e) a retaining pin on said shaft, said retaining pin being located inside said housing unit near the first retaining cap;

f) a spring abutment flange mounted on said shaft and abutting said retaining pin;

g) a compression spring surrounding said shaft, said compression spring having one end abutting said spring abutment flange and a second end abutting the inner surface of the first retaining cap, said compression spring biasing said shaft away from the first end of the cylindrical wall of said housing unit toward the second end of the cylindrical wall of said housing unit to bias said shaft toward the locked position of said shaft and away from the unlocked position of said shaft;

h) a handle fixedly mounted on the second end of said shaft;

i) a shaft unlocking unit mounted on said housing unit, said shaft unlocking unit including
(1) two pivot pins fixed to the cylindrical wall adjacent to the second end of the cylindrical wall,
(2) a U-shaped handle having one leg pivotally connected to one pivot pin of the two pivot pins at a proximal end of the one leg and a second leg pivotally connected to a second pivot pin of the two pivot pins at a proximal end of the second leg, and a bight section having one end connected to a distal end of the first leg and a second end connected to a distal end of the second leg, the handle being movable between a shaft-locking position in which the bight section of the handle is spaced apart from the longitudinal axis of said housing unit with the bight section of the handle being spaced apart from the second end of said shaft and a shaft-unlocking position in which the bight section of the handle intersects the longitudinal axis of said housing unit and the longitudinal axis of said shaft with the second end of said shaft being in abutting contact with the bight section of the handle when the handle is in the shaft-unlocking position, said shaft being held in the unlocked position against the bias of said compression spring with said locking pin being spaced apart from the notch in the rim of the shaft-accommodating collar on the first retaining cap by the abutting contact between the second end of the shaft and the bight section of the handle when the handle is in the shaft unlocking position, said shaft moving into the locked position with the locking pin in the notch in the rim of the shaft-accommodating collar on the first retaining cap under the influence of the bias of said compression spring when the bight section of the handle is moved away from abutting contact with the second end of said shaft when the handle is moved from the shaft unlocking position into the shaft locking position;

j) a flexible camouflage blind element having a first end fixed to said shaft and a second end, said blind element being adapted to be wound around said shaft when said shaft is rotated in one direction and to be unwound from said shaft when said shaft is rotated in a second direction, said blind element having surface indicia thereon, said blind element extending from inside said housing unit to outside said housing unit through the elongate slot defined through said cylindrical wall of said housing unit;

k) a plurality of first mounting straps fixed to the second end of said blind element, each first mounting strap including
(1) a body,
(2) a first strap end fixed to the second end of said blind element,
(3) a second strap end spaced apart from the first strap end, and
(4) a snap fastener releasably coupling the second strap end to the body of the first mounting strap;

l) a plurality of D-rings mounted on the outer surface of the cylindrical wall of said housing unit;

m) a plurality of second mounting straps, each second mounting strap being fixed to a corresponding one of said D-rings, each second mounting strap including
(1) a body,
(2) a first strap end,
(3) a second strap end, and
(4) a snap fastener.

2. A portable hunting blind comprising:
a) a housing unit;
b) a shaft rotatably mounted in said housing unit;
c) flexible camouflage material connected to said shaft to be wound around said shaft when said shaft rotates in a winding direction and to be unwound off of said shaft when said shaft is rotated in an unwinding direction;
d) a lock on said shaft to prevent rotation of said shaft when said lock is engaged, said shaft being movably mounted on said housing unit to move between a locked position with said lock engaged to prevent rotation of said shaft and an unlocked position with said lock disengaged to permit rotation of said shaft in either the winding direction or the unwinding direction;
e) mounting elements on said housing unit which are attachable to a first support;
f) mounting elements on said flexible camouflage material that are attachable to a second support
g) a biasing unit on said shaft which biases said shaft toward the locked position; and
h) a hand crank on said shaft for tightening the flexible camouflage material when the mounting elements on said housing unit and the mounting units on said flexible camouflage material are attached to the first and second supports respectively.

3. The portable hunting blind defined in claim 2 wherein said mounting elements include straps.

4. The portable hunting blind defined in claim 3 wherein said housing unit includes a slot defined therein and said camouflage material extends through the slot.

5. The portable hunting blind defined in claim 4 wherein said lock further includes a handle pivotally mounted on said housing unit and moving between a shaft-unlocking position engaging said shaft and a shaft-locking position spaced apart from said shaft.

* * * * *